United States Patent
Niknam et al.

(10) Patent No.: US 10,123,164 B2
(45) Date of Patent: Nov. 6, 2018

(54) METHOD AND SYSTEM FOR INITIATING A COMMUNICATION PROTOCOL

(71) Applicant: Bunq B.V., Amsterdam (NL)

(72) Inventors: Ali Niknam, Amsterdam (NL); Stijn Van Drongelen, Amsterdam (NL); Andreas Verhoeven, Amsterdam (NL); Menno Arnold Den Hollander, Amsterdam (NL); Robert-Jan Mahieu, Amsterdam (NL)

(73) Assignee: Bunq B.V., Amsterdam (NL)

( * ) Notice: Subject to any disclaimer, the term of this patent is extended or adjusted under 35 U.S.C. 154(b) by 0 days.

(21) Appl. No.: 15/598,509

(22) Filed: May 18, 2017

(65) Prior Publication Data
US 2017/0339520 A1 Nov. 23, 2017

(30) Foreign Application Priority Data
May 19, 2016 (EP) .................................... 16170435

(51) Int. Cl.
*H04W 24/00* (2009.01)
*H04W 4/021* (2018.01)
(Continued)

(52) U.S. Cl.
CPC ........... *H04W 4/021* (2013.01); *G01S 5/0284* (2013.01); *H04W 4/023* (2013.01); *H04W 76/10* (2018.02);
(Continued)

(58) Field of Classification Search
CPC ..... H04W 16/18; H04W 16/22; H04W 12/04; H04W 4/026; H04W 4/206; H04W 64/00; H04W 84/18
(Continued)

(56) References Cited

U.S. PATENT DOCUMENTS

| | | | |
|---|---|---|---|
| 2002/0154128 A1* | 10/2002 | Zachmann | B25J 9/1664 345/474 |
| 2006/0257031 A1* | 11/2006 | Abramoff | G06K 9/6277 382/224 |

(Continued)

FOREIGN PATENT DOCUMENTS

| | | |
|---|---|---|
| EP | 2978249 A1 | 1/2016 |
| WO | 0249374 A2 | 6/2002 |
| WO | 2004112343 A1 | 12/2004 |

OTHER PUBLICATIONS

"European Search Report", European Patent Application 17170891.0, dated Sep. 19, 2017, 6 pp.

(Continued)

*Primary Examiner* — Joseph Arevalo
(74) *Attorney, Agent, or Firm* — Kaplan Breyer Schwarz, LLP

(57) ABSTRACT

In a server system, a computer-implemented method of initiating a proximity-based communication protocol involving a first and one or more second client devices. For each of plural candidate second devices location coordinates are retrieved and an associated axis aligned bounding box AABB is calculated. When AABB of such candidate second devices overlap with an AABB for the first device, the candidate is presented to the user of the first device. Next, a selection of one or more candidate second devices is received from the first device and causing the protocol to be initiated between the first device and the one or more selected candidate second devices.

10 Claims, 5 Drawing Sheets

(51) Int. Cl.
*H04W 4/02* (2018.01)
*G01S 5/02* (2010.01)
*H04W 76/10* (2018.01)
*G01S 5/12* (2006.01)
*H04W 12/06* (2009.01)
*H04W 4/21* (2018.01)
*H04W 4/80* (2018.01)

(52) U.S. Cl.
CPC .............. *G01S 5/12* (2013.01); *H04W 4/21* (2018.02); *H04W 4/80* (2018.02); *H04W 12/06* (2013.01)

(58) Field of Classification Search
USPC ............ 455/456.1, 418, 509, 445, 158.4, 75
See application file for complete search history.

(56) References Cited

U.S. PATENT DOCUMENTS

| | | | |
|---|---|---|---|
| 2007/0024615 A1* | 2/2007 | Keller | G06T 15/06 345/421 |
| 2008/0043018 A1* | 2/2008 | Keller | G06T 15/06 345/426 |
| 2014/0362074 A1* | 12/2014 | Karras | G06T 15/06 345/419 |
| 2015/0199458 A1* | 7/2015 | Bacon | G06F 17/5009 703/8 |
| 2016/0378892 A1* | 12/2016 | Ishikawa | A63F 13/577 703/6 |
| 2017/0272722 A1* | 9/2017 | Salvi | H04N 13/0018 |

OTHER PUBLICATIONS

Angus K.Y. Wang, "The Near-Me Area Network", IEEE Internet Computing, Spotlight, Mar./Apr. 2010, pp. 74-77.

* cited by examiner

METHOD AND SYSTEM FOR INITIATING A COMMUNICATION PROTOCOL

FIELD OF THE INVENTION

The invention relates to a computer-implemented method, in a server system, of initiating a communication protocol between a first and one or more second client devices. The invention further relates to a server system, a client device and to computer-readable nonvolatile storage media comprising executable code for causing a computer to operate as the server system or the client device of the invention.

BACKGROUND OF THE INVENTION

The rise of smartphones and other mobile devices is enormous. It is estimated over 1.5 billion such devices have been sold by the end of 2013. Smartphones and other mobile devices are ubiquitous, especially thanks to the huge variety of applications ("apps") offered for these devices. For almost any application or field there is a multitude of apps to make life easier, entertain people or provide an otherwise useful service.

Owners of mobile devices can carry out communication and services with each other, or with automated services, using these applications. For example, one may chat with others, send and retrieve e-mail, transmit files, play games, manage social networking, receive information such as weather updates or carry out financial transactions with one another, potentially also through third parties like the game service provider, social network server or bank. These communications require certain underlying technical communication protocols.

A technical challenge with any such communication protocol is selecting the right party to communicate with. While many technical solutions exist, these are often technically complex or require prior registration of clients so as to be certain that the right entity is being communicated with. For example websites may initiate a Secure Socket Layer security protocol to secure the communication with a client. Users may be requested to log into a service to authenticate themselves before they can communicate with other users, as in chatboxes and online forums. In the context of device to device communication, the Bluetooth protocol requires two devices to be 'paired' with each other, involving the entry of a four-digit PIN in each device so as to recognize the other device. Other protocols may require each client device to authenticate itself with a password or PIN to the server. This is perceived by users as cumbersome.

International patent application WO2004112343 provides a method in a user computing device for presenting dialogs in a set of computing devices including the user computing device. Responsive to a request to present a dialog, computing devices within the set of computing devices in a selected proximity of the user computing device are identified to form a set of proximate computing devices. The dialog is presented on only one of the user computer device and the set of proximate computing devices based on a policy. This policy is however set manually, which is cumbersome and not flexible enough.

This cumbersomeness is particularly present when two devices are close to one another. In that context, users see little reason for complex pairing or authentication protocols. If they can see they are close, or talk to each other with ease, then why should communicating through their phones be complex?

This complexity often turns out to be related to a needless drive for perfection. For example, to determine if two devices are in proximity, it is logical to take the GPS locations of both devices and calculate the length of a straight line between them. However, as it is well known that GPS locations are inaccurate, first the measured coordinates need to be corrected. To this end, a skilled person would first apply a correction based on an inaccuracy of the GPS measurement to arrive at estimated coordinates for both devices, and then calculate the length of the line between them. For other location determination techniques similar problems may exist. All location determination techniques are to a certain extent inaccurate, and further steps will need to be taken to create a more accurate location determination.

While this is a correct approach, the inventors of the present invention have realized a simpler approach is possible in the situation where no more is needed than a determination if two devices are in proximity of each other. The technical problem therefore is determine more efficiently if two devices are in proximity of each other given inaccurate measurements of their respective locations.

SUMMARY OF THE INVENTION

The invention solves the above technical problem as follows. After (a) identifying one or more potential second devices from a plurality of available second devices, the available second devices having previously activated respective protocol initiation means for the protocol at respective points in time and (b) retrieving for the first device and each of the candidate second devices respective location coordinates, for each of the retrieved location coordinates an axis aligned bounding box AABB is calculated. This provides a rough estimate of the location for each of the devices. Next (c) for the AABB associated with each of the candidate second devices an overlap with the AABB of the first device is calculated, where for the first device the AABB is calculated covering a circle having the retrieved location coordinates of the first device as its centre and an estimate of the measurement uncertainty of the location measurement and a predetermined maximum distance as its radius, and for each second device the AABB is calculated covering a circle having the retrieved location coordinates of the second device as its centre and an estimate of the measurement uncertainty of the location measurement as its radius, While this calculation does not result in a precise location of the first or each of the second devices, the AABB does provide sufficient information for the next step, namely (d) selecting a subset of the candidate second devices as those candidate second devices whose AABB overlap with the AABB of the first device. The overlap between AABB's is enough for the purpose of the invention, namely selecting devices that are in proximity. Preferably the subset is selected as only a predetermined number of candidate second devices, e.g. a top ten, whose AABB overlap with the AABB of the first device is relatively highest.

This selected subset is communicated to the first device. Subsequently (e) a selection of one or more candidate second devices from the subset is received from the first device and the protocol is caused to be initiated between the first device and the one or more selected candidate second devices. Nothing more than inaccurate location determination is necessary for this goal.

In an embodiment, step (a) comprises the substep of eliminating from the potential second devices those devices whose respective points in time for activation of their respective protocol initiation means lay more than a predetermined amount of time in the past, thereby obtaining one or more candidate second devices. This provides an easy criterion for reducing the size of the subset devices to increase the speed of the method. Eliminating these devices from the subset is useful as it is known to be likely that people initiate protocols such as contemplated by the invention when they need them. Therefore devices that activated their protocol initiation means a relatively longtime ago are unlikely to be candidates for the protocol with a device that recently activated its protocol initiation means.

In a further embodiment, in step (d) the subset is further selected by only including a predetermined number of candidate second devices whose distance to the first device is relatively lowest, employing an accurate distance calculation algorithm. This provides another useful option for reduction of the subset by eliminating devices unlikely to be candidates for the protocol first device. While employing the accurate algorithm is more costly in terms of time and processing power than the invention contemplates, this embodiment reduces the impact of such employing as it is done only for the subset selected in step (d) earlier.

In a further embodiment, in step (d) the subset is further selected by only including a predetermined number of candidate second devices who most recently activated their respective protocol initiation means. This provides another useful option for reduction of the subset by eliminating devices unlikely to be candidates for the protocol first device. As noted, it is known to be likely that people initiate protocols such as contemplated by the invention when they need them. Therefore, the time of activation in these other devices is an efficient selection criterion.

In a further embodiment, in step (d) the subset is further selected by only including a predetermined number of candidate second devices whose identity is present in an address book associated with the first device. This provides another useful option for reduction of the subset by eliminating devices unlikely to be candidates for the protocol first device. It is known to be likely that people initiate protocols such as contemplated by the invention with other people they know. The fact that they know certain other people can be derived with some certainty from the fact that one or more devices owned by these other people are present in an address book on the first device.

In a further embodiment, in step (d) the subset is further selected by only including a predetermined number of candidate second devices which did not engage in the protocol with the first device within a predetermined period of time in the past. This provides another useful option for reduction of the subset by eliminating devices unlikely to be candidates for the protocol first device. It is known to be unlikely that people would wish to execute the protocol with the same other devices twice in a short period of time. Therefore, eliminating those other devices makes it likely the better choice is available.

In a further embodiment, in step (d) the subset is further selected by only including a predetermined number of candidate second devices which previously engaged in the protocol with the first device within a predetermined period of time in the past. This provides another useful option for reduction of the subset by eliminating devices unlikely to be candidates for the protocol first device. Conversely, in some situations the user may wish to repeat protocol with these devices.

The invention further provides for a server and a client device for executing the method of the invention, and for a computer-readable nonvolatile storage medium comprising executable code for causing a computer to operate as the device of the invention.

BRIEF DESCRIPTION OF THE FIGURES

The invention will now be explained in more detail with reference to the figures, in which.

In the figures, same reference numbers indicate same or similar features. In cases where plural identical features, objects or items are shown, reference numerals are provided only for a representative sample so as to not affect clarity of the figures.

DETAILED DESCRIPTION OF CERTAIN EMBODIMENTS

Figure 1:
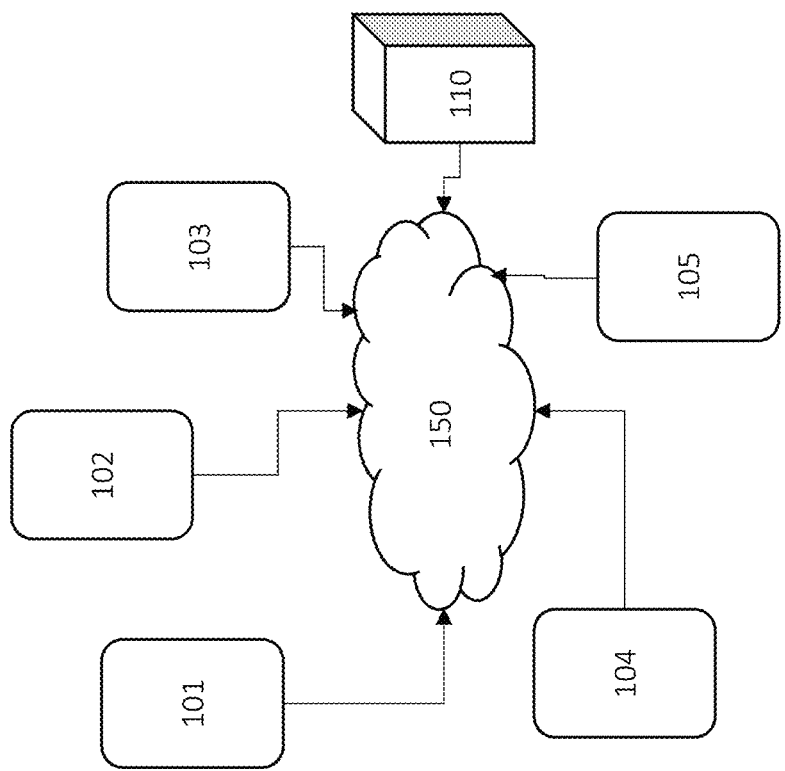
FIG. 1 schematically shows an arrangement in accordance with the invention, comprising plural client devices and a server system.

FIG. 1 schematically shows an arrangement in accordance with the invention, comprising plural client devices 101, 102, 103, 104, 105 and a server system 110. The client devices 101-105 may be embodied as mobile phones, tablets or similar devices provided with computer programs, colloquially known as apps, to provide the functionality to be discussed below.

The client devices 101-105 and the server 110 are able to communicate with each other and/or with further systems through networks such as the internet 150. For example the devices 101-105 may have wireless or wired internet connections using the 802.11 communication protocol or employ 3G or 4G wireless access to internet 150.

In this setting it is assumed the client device 101 is the first client device in accordance with the invention. The device 101, or rather its operator, wishes to initiate a communication protocol involving another device that is nearby. This device will hereafter be called the second device. The protocol may comprise exchange of data between the first and second device directly. The protocol may also involve exchange of data between the devices and the server, e.g. the first device sends data to the server 110 and the server 110 sends data to the second device. The server 110 may transform the data sent to the second device or send other data produced in response to the data sent by the first device. For example, the first device may send a request, and the server 110 produces a response sent to the second device. The server 110 may participate in the protocol in other ways as well.

The manner in which the nearby nature of the second device is determined will now be discussed with reference to FIG. 2

Figure 2:
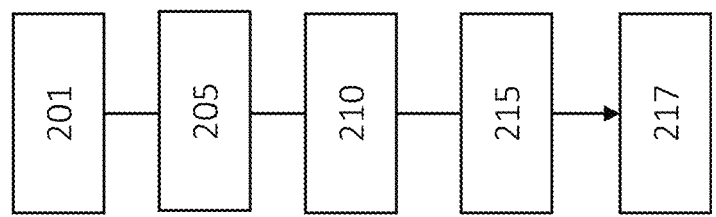
FIG. 2 schematically illustrates the method of the invention.

FIG. 2 schematically illustrates the method of the invention in the form of a communication diagram. The method starts at 201 with the step of identifying one or more candidate second devices from the plurality of available second devices 102-105, the available second devices 102-105 having previously activated respective protocol initiation means 401 for the protocol at respective points in time.

Optionally, the server system 110 may eliminate from this set of candidate second devices those devices whose respective points in time for activation of their respective protocol initiation means lay more than a predetermined amount of time in the past.

For ease of reading the invention is described below with reference to GPS coordinates only. Alternative to using the GPS, other location determination techniques can be used. For example, a location can be triangulated based on measuring signals from three or more signal origins. Another example: location can be estimated by searching for a combination of all wireless network SSID's in the vicinity in a database, which is generally unique.

In step 205, the server system 110 retrieves for the first device 100 and each of the candidate second devices 102-105 respective Global Positioning System (GPS) coordinates and calculates for each of the retrieved GPS coordinates an axis aligned bounding box AABB. This step is known as such. It is worth noting that normally, the AABB would be used as an input to calculate precise GPS coordinates. This is not the case in the present invention.

In step 210, the server system 110 calculates for the AABB associated with each of the candidate second devices an overlap with the AABB of the first device 101. For the first device 101 the AABB is calculated covering a circle having the retrieved GPS coordinates of the first device 101 as its centre and an estimate of the measurement uncertainty of the GPS measurement and a predetermined maximum distance as its radius. The predetermined maximum distance provides for an upper limit on the definition of 'nearby'.

For each second device 102-105 the AABB is calculated covering a circle having the retrieved GPS coordinates of the second device as its centre and an estimate of the measurement uncertainty of the GPS measurement as its radius.

Having calculated the AABB's, the server system 110 proceeds in step 215 to select a subset of the candidate second devices as those candidate second devices whose AABB overlap with the AABB of the first device.

Various refinements to this step may be thought of, either alone or in combination with each other. For example, the subset could be limited to a predetermined number of candidate second devices whose overlap is relatively highest, e.g. a top ten of devices ranked by amount of overlap could be construed. In a further embodiment, the server system in this step only includes a predetermined number of candidate second devices whose distance to the first device 101 is relatively lowest, employing an accurate GPS distance calculation algorithm. In a yet further embodiment, only those second devices are included who most recently activated their respective protocol initiation means. Alternative to only selecting certain devices, one may adjust an ordering of the devices using the said criteria.

In another embodiment, only those second devices are included whose identity is present in an address book associated with the first device 101. This would require that the first device 101 is equipped with address book management means.

In yet another embodiment, only those second devices are included that did not engage in the protocol with the first device 101 within a predetermined period of time in the past. Conversely, in an alternate embodiment, only those second devices are included that previously engaged in the protocol with the first device 101 within a predetermined period of time in the past.

The server system 110 communicates in step 217 the subset to the first device. Next, in step 220 the server system 110 receives a selection of one or more candidate second device from the subset from the first device 101 and causes in step 230 the protocol to be initiated between the first device 101 and the selected candidate second device(s). In many protocols, only a single second device will be involved but multiparty protocols also exist.

Figure 3:
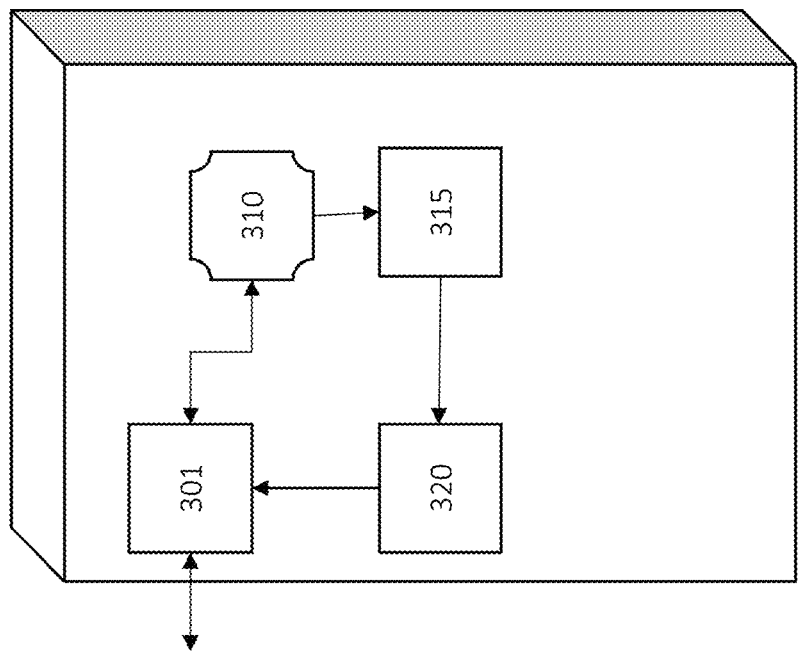
FIG. 3 schematically shows the server system in more detail.
Figure 5A:
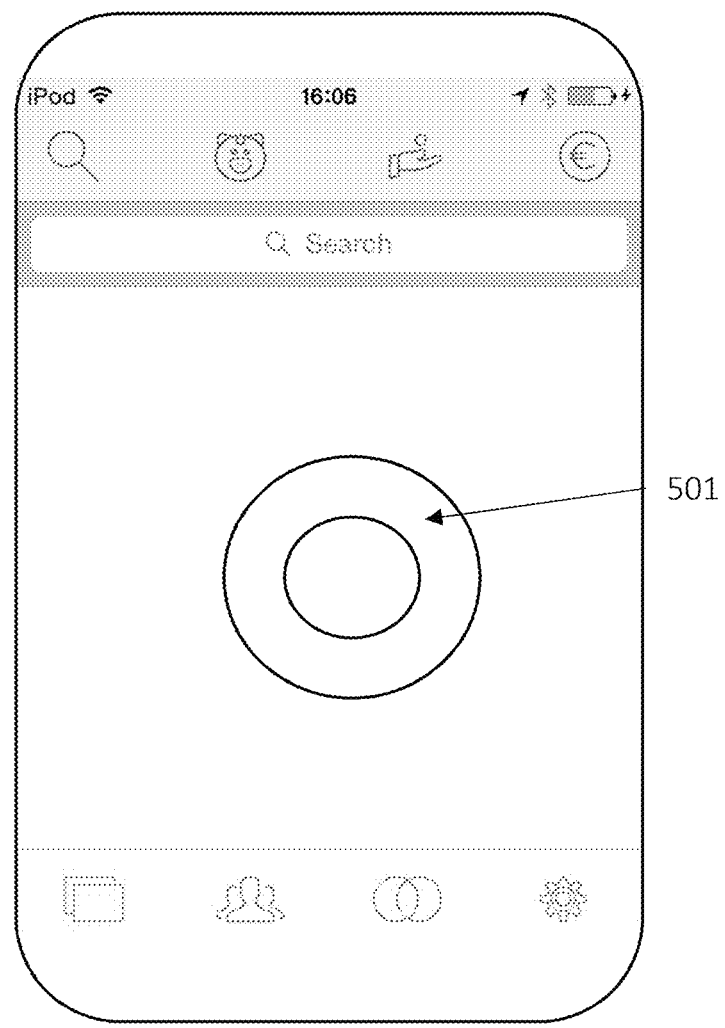
FIGS. 5(a), 5(b) and 5(c) schematically show user interface screens on client devices.
Figure 5B:
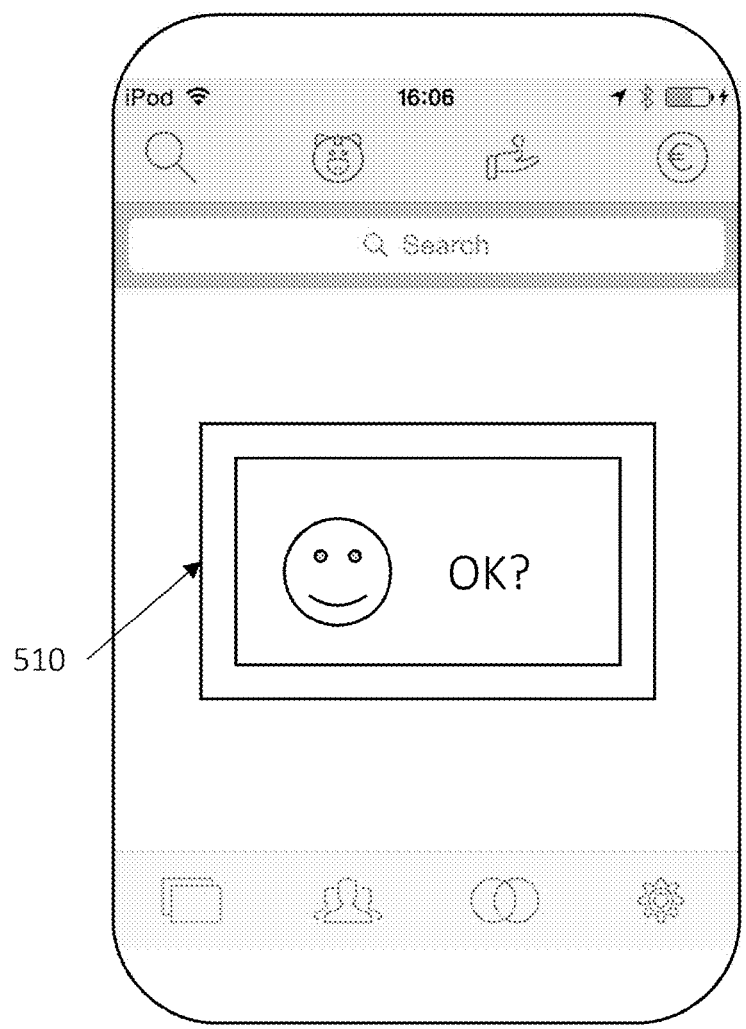
Figure 5C:
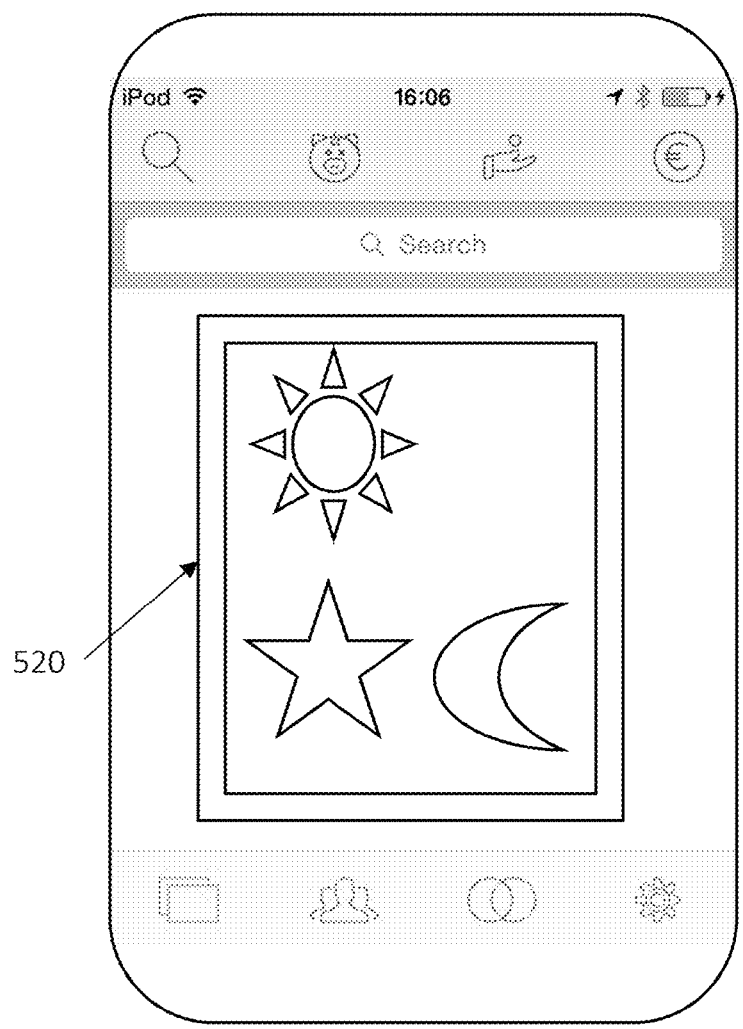

FIG. 3 schematically shows the server system 110 in more detail. The server 110 is configured for executing the method of FIG. 2 between first device 101 and one of the second client devices 102-105 over network 150, resulting in the protocol to be initiated between the first device 101 and the selected candidate second device.

The server 110 comprises a communication module 301 for communicating with the devices 101-105 over the network 150. The module 301 may comprise internet communication means as are known in the art. Other techniques for communicating with other devices over a network may also be employed.

Typically, the communication module 301 receives from the first client device 101 a request to initiate the communication protocol. Alternatively, the server system 110 may itself initiate the protocol. In any event, this initiates step 201 of the method, namely identifying one or more candidate second devices from the plurality of available second devices 102-105 as devices having previously activated respective protocol initiation means 401 for the protocol at respective points in time. Typically, when a device 101-105 activates these protocol initiation means it sends a message indicative of this event to the server system 110, allowing the server system 110 to determine the candidates that are available. In another embodiment the server system 110 may send a broadcast message or a set of unicast messages to the devices 101-105 to actively acquire information on the activation of their respective protocol initiation means 401 for the protocol.

Position determination module 310 retrieves for the first device 100 and each of the candidate second devices 102-105 respective Global Positioning System (GPS) coordinates. These coordinates are typically retrieved from the devices in question, which are typically equipped with GPS subsystems. In other embodiments, the devices may be equipped to communicate with other devices that are equipped with GPS subsystems, e.g. a mobile gadget communicates with a base station that has GPS capability.

Position determination module 310 feeds these inaccurate GPS coordinates to box calculator 315 which, as per step 205, calculates for each of the retrieved GPS coordinates an axis aligned bounding box AABB. The AABB's are fed to overlap calculator 317 which, following step 210, calculates for the AABB associated with each of the candidate second devices an overlap with the AABB of the first device 101.

The results of the calculation are fed to device selector 320 which select a subset of the candidate second devices as a predetermined number of candidate second devices whose AABB overlap with the AABB of the first device is relatively highest, optionally also applying other refinements as noted above with reference to step 215.

The communication module 301 receives the selected subset from device selector 320 and communicates the subset to the first device 101 as per step 217. Next, communication module 301 receives from device 101 a selection of one or more candidate second devices from the subset from the first device 101 and activates module 320 which, following step 230, causes the communication protocol to be started involving the first and the second client devices. As noted above the server 110 may or may not take part in this communication protocol.

Figure 4:
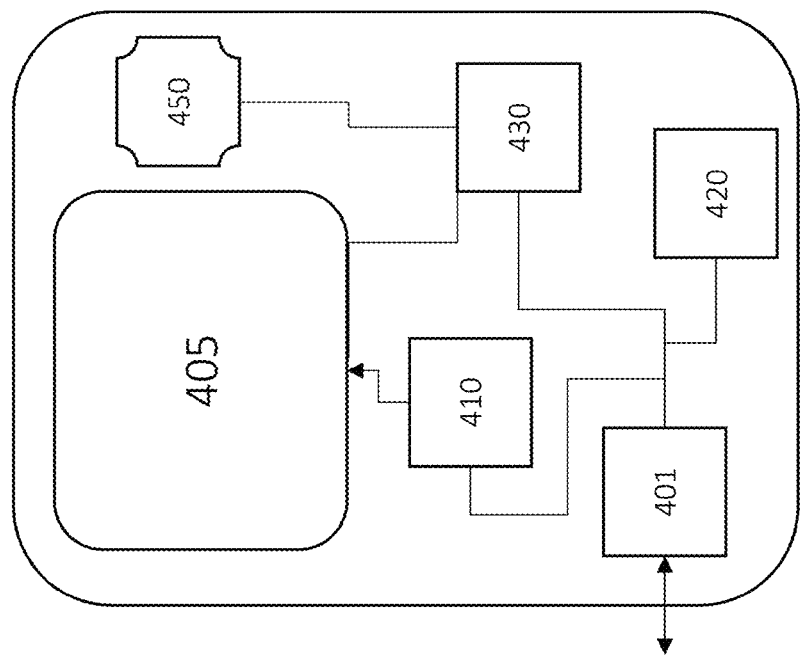
FIG. 4 schematically shows a client device in more detail.

FIG. 4 schematically shows the client device 101 in more detail. The client device 101 is configured for initiating a communication protocol with a second client device with the aid of server 110, employing the method disclosed above with reference to FIG. 2.

Client device 101 comprises communication module 401, which is configured for sending to the server system 110 a request to initiate the transaction. The request is picked up at the server 110 using its module 301, and as described above with reference to FIG. 3 the server 110 selects a set of candidate second devices and communicates the subset to the first device 101, where module 401 receives them.

The client device 101 further comprises a display 405 where the indications are presented for an operator of the client device 101 to make a selection. The indications can be presented e.g. as a list where a selection can be made by selecting the indication desired. This can be done e.g. with a cursor or, when a touch-sensitive display is employed, with a detection of a finger along the display. Alternatively to letting the operator make a selection, the client device 101 may itself make a selection using predefined selection criteria such as a name comprised in the indication matching a name acquired earlier.

Selection module 410 is provided to facilitate the making of the selection. The outcome of the selection is fed again to module 401, which transmits to the server the selection of one client device from the one or more selected client devices. This selected client is the second client device in the communication protocol that is subsequently executed by module 420.

Of course client device 101 may additionally act as a second device in the protocol, i.e. another device 102-105 has sent the request of step 201. To this end, the device 101 is further provided with a participation determination module 430. The module 401 receives the request from the server 110 in step 205 and feeds the request to this module 430.

The module 430 acquires a location of device 101 and a willingness to participate in the communication protocol. The location of device 101 is determined by location module 450, e.g. a GPS receiver although other techniques for determining location can also be used. The willingness to participate can be determined by prompting an operator to make an explicit choice, e.g. pressing a button or selecting an item on display 405.

An alternative is to make the determination automatic, e.g. by determining that the device 101 is in a particular state. For example willingness can be determined from the fact that a particular application or 'app' is currently active on the device and is on a foreground of the display 405 of the device. Alternatively or in addition to being in the foreground, a particular menu or function may need to be open or active to arrive at the determination that the device 101 is willing to participate in the communication protocol.

Closing Notes

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

Some or all aspects of the invention may be implemented in a computer program product, i.e., a collection of computer program instructions stored on a computer readable storage device for execution by a computer. The instructions of the present invention may be in any interpretable or executable code mechanism, including but not limited to scripts, interpretable programs, dynamic link libraries (DLLs) or Java, PHP or Objective C classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example, semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. In a server system, a computer-implemented method of initiating a proximity-based communication protocol involving a first and one or more second client devices, the method comprising:
   (a) identifying one or more potential second devices from a plurality of available second devices, the available second devices each comprising a protocol initiation module for the proximity-based communication protocol and each having previously activated said protocol initiation module at respective points in time,
   (b) retrieving for the first device and each of the candidate second devices respective location coordinates and calculating for each of the retrieved location coordinates an axis aligned bounding box (AABB),
   (c) calculating for the AABB associated with each of the candidate second devices an overlap with the AABB of the first device, where
      for the first device the AABB is calculated covering a circle having the retrieved location coordinates of the first device as its centre and an estimate of the measurement uncertainty of the location measurement and a predetermined maximum distance as its radius, and
      for each second device the AABB is calculated covering a circle having the retrieved location coordinates of the second device as its centre and an estimate of the measurement uncertainty of the location measurement as its radius,
   (d) selecting a subset of the candidate second devices where the AABB of the candidate second devices overlap with the AABB of the first device, and communicating the subset to the first device,
   (e) receiving a selection of one or more candidate second devices from the subset from the first device and causing the protocol to be initiated between the first device and the one or more selected candidate second devices.

2. The method of claim 1, comprising a substep in step (a) of eliminating from the potential second devices those devices whose respective points in time for activation of their respective protocol initiation module lay more than a predetermined amount of time in the past, thereby obtaining one or more candidate second devices.

3. The method of claim 1, in which in step (d) the subset is selected as only a predetermined number of candidate second devices whose AABB overlap with the AABB of the first device is relatively highest.

4. The method of claim 1, in which in step (d) the subset is further selected by only including a predetermined number of candidate second devices whose distance to the first device is relatively lowest, employing an accurate distance calculation algorithm.

5. The method of claim 1, in which in step (d) the subset is further selected by only including a predetermined number of candidate second devices who most recently activated their respective protocol initiation module.

6. The method of claim 1, in which in step (d) the subset is further selected by only including a predetermined number of candidate second devices whose identity is present in an address book associated with the first device.

7. The method of claim 1, in which in step (d) the subset is further selected by only including a predetermined number of candidate second devices which did not engage in the protocol with the first device within a predetermined period of time in the past.

8. The method of claim 1, in which in step (d) the subset is further selected by only including a predetermined number of candidate second devices which previously engaged in the protocol with the first device within a predetermined period of time in the past.

9. A server system for initiating a proximity-based communication protocol involving a first and a second client device, the server system comprising:
- (a) a communication module configured to receive messages from one or more of a plurality of available second devices, the available second devices each comprising a protocol initiation module for the proximity-based communication protocol and each having previously activated said protocol initiation module at respective points in time, said messages being indicative of said previous activation, and for identifying the one or more second devices as candidate second devices,
- (b) a position determination module configured to retrieve for the first device and each of the candidate second devices respective location coordinates and box calculation module configured to calculate for each of the retrieved location coordinates an axis aligned bounding box AABB,
- (c) an overlap calculation module configured to calculate for the AABB associated with each of the candidate second devices an overlap with the AABB of the first device, where
  - for the first device the AABB is calculated covering a circle having the retrieved location coordinates of the first device as its centre and an estimate of the measurement uncertainty of the location measurement and a predetermined maximum distance as its radius, and
  - for each second device the AABB is calculated covering a circle having the retrieved location coordinates of the second device as its centre and an estimate of the measurement uncertainty of the location measurement as its radius,
- (d) a device selection module configured to select candidate second devices whose AABB overlap with the AABB of the first device, and communicating the subset to the first device,
- (e) the communication module being configured for receiving a selection of one or more candidate second devices from the subset from the first device, and
- (f) a protocol initiation module configured to cause the protocol to be initiated between the first device and the one or more selected candidate second devices.

10. A non-transitory computer-readable nonvolatile storage medium comprising executable code for causing a computer to operate as the server system of claim 9.

* * * * *